United States Patent [19]

Beerbaum

[11] 4,384,356

[45] May 17, 1983

[54] WIDE BAND MODEM FOR HIGH SPEED DATA TRANSMISSION

[75] Inventor: Ronald H. Beerbaum, Southbury, Conn.

[73] Assignee: Britsol Babcock Inc., Waterbury, Conn.

[21] Appl. No.: 250,859

[22] Filed: Apr. 3, 1981

[51] Int. Cl.³ .............................................. H03H 7/38
[52] U.S. Cl. ........................................ 375/36; 375/8; 179/2 DP
[58] Field of Search .................... 375/3, 7, 8, 5, 36; 370/24, 31, 41, 85, 86; 179/2 DP

[56] References Cited

U.S. PATENT DOCUMENTS

| | | | |
|---|---|---|---|
| 3,504,118 | 3/1970 | Hans-Martin | 375/8 |
| 3,721,958 | 3/1973 | Dixon | 375/7 |
| 4,110,711 | 8/1978 | Gaetano et al. | 375/36 |
| 4,205,360 | 5/1980 | Drucker | 375/7 |
| 4,254,501 | 3/1981 | Griffith et al. | 375/36 |

Primary Examiner—Benedict V. Safourek
Assistant Examiner—Stephen Chin
Attorney, Agent, or Firm—Pennie & Edmonds

[57] ABSTRACT

A method and apparatus are described for coupling a high-speed data communication modem to a communication line such as a coaxial cable with minimal transmission losses when the modem is not transmitting data. The transmitter coupling apparatus comprises a transformer, first and second transistors, biasing circuits for each of the transistors and a low-pass filter. The data signal to be transmitted is applied to the first transistor which is biased for linear amplification when data are being transmitted and for saturation when data are not being transmitted. The output of the first transistor is applied to the primary winding of the transformer where it is coupled to the secondary winding which is connected in series with the central conductors of the coaxial transmission line. When saturated, the first transistor grounds the winding terminal to which it is connected. The second transistor is biased so as to couple a power supply through the low-pass filter to the other terminal of the primary winding when data are being transmitted and to be non-conducting when data are not being transmitted. The low-pass filter and the first transistor provide a short circuit with respect to high frequency signals across the primary winding when data are not being transmitted. The receiver is likewise transformer coupled with its primary winding being in shunt across the transmission line. As a result of these connections, the output impedance of the transmitter can be made small enough so that the modem insertion loss is about 0.2 db.

6 Claims, 4 Drawing Figures

WIDE BAND MODEM FOR HIGH SPEED DATA TRANSMISSION

CROSS REFERENCE TO RELATED APPLICATION

A related application, incorporated herein by reference, is "Switched Frequency Divider" filed concurrently herewith and assigned to Bristol Babcock Inc.

BACKGROUND OF THE INVENTION

This relates to a modulator/demodulator, or modem, used to transmit and receive data in a data communication system and more particularly to a method and apparatus for operating wide band modems to provide high speed data transmission in a communication network.

As is well known, data is often transmitted over a communication line in the form of pulses of certain frequencies. At one station in the network, the modulator in the transmitter portion of a modem is used to convert a DC signal representative of a stream of digital data into an AC signal representative of this same stream of digital data. At another station in the network, a demodulator in a receiver portion of a second modem converts received AC signals back to digital DC signals. Ordinarily, data communication takes place in both directions on the communication line and each modem is equipped both to convert DC signals to AC signals that are transmitted and to convert received AC signals to DC signals.

In a data communication system using frequency shift keying (FSK), one of the two DC levels that represents digital data is converted by the modem to an AC signal having a first frequency; and the other level of the DC signal is converted to an AC signal having a second frequency. It is conventional in the art to refer to one of these DC levels and the corresponding AC frequency as a SPACE or "0", and to the other DC level and the corresponding AC frequency as a MARK or "1".

Modems are used in many types of data communication systems. Of particular interest to the present invention are the wide band modems used for high speed data transmission in a distributed processing system. In these systems modems are used to couple individual stations to a common coaxial line. Each station includes a data source, a data sink, or both. For example, the station might include a Teletype terminal, a keyboard, an intelligent terminal, a microcomputer, or a central processing unit. Because of the speed at which the computers in such a system are able to generate and transmit data, it is desirable to interconnect the individual stations by modems and transmission lines which are capable of high speed communication. In particular, it is desirable to use wide band high frequency modems and transmission lines.

To minimize signal losses in transmitting high frequency signals, it is necessary in such systems to interconnect the individual stations by a coaxial line. The use of such a line, however, raises additional problems. Typically, each station is connected to the line via a simple T-coupler such that the signal amplitude is split in half at each coupler. Obviously, this places severe constraints on the number of stations that may be coupled in a single system. Other restrictions are imposed on the minimum distance between stations.

SUMMARY OF INVENTION

I have devised a method and apparatus for coupling a high-speed data communication modem to a communication line such as a coaxial cable with minimal transmission losses when the modem is not transmitting data. In accordance with my invention, the transmitter coupling apparatus comprises a transformer, first and second transistors, biasing circuits for each of the transistors and a low-pass filter. The data signal to be transmitted is applied to the first transistor which is biased for linear amplification when data are being transmitted and for saturation when data are not to be transmitted. The output of the first transistor is applied to the primary winding of the transformer where it is coupled to a secondary winding connected in series with the central conductors of two portions of the coaxial cable communication line. When saturated, the first transistor grounds the winding terminal to which it is connected. The second transistor is biased so as to couple a power supply through the low-pass filter to the other terminal of the primary winding when data are being transmitted and to be nonconducting when data are not to be transmitted. The low-pass filter and the first transistor provide a short circuit with respect to high frequency signals across the primary winding when data are not being transmitted.

The receiver is also transformer coupled to the coaxial line with the primary winding of the receiver transformer being in shunt across the transmission line. Illustratively the input impedance to the receiver is in excess of 7,000 Ohms.

Under these conditions, the output impedance of the transmitter can be made low enough that the total modem insertion loss is about 0.2 db. Such low losses permit the connection of a relatively large number of modems to the coaxial line and/or the use of a relatively long coaxial communication line.

Advantageously, the modem transmitter of my invention is also provided with circuitry to disconnect the transmitter and short the primary transformer winding if the transmitter fails. Under normal operation of the transmitter, a control circuit holds open a relay. If power should fail or any of several other mishaps occur, the relay closes to establish a short circuit across the first winding of the transformer. As a result, a failure in the transmitter will not leave the first winding of the transformer in an open circuit condition which would cause additional signal loss in the communication system.

BRIEF DESCRIPTION OF THE DRAWINGS

These and other objects, features and advantages of my invention will be more readily apparent from the following detailed description of the best mode for carrying out the invention in which.

BEST MODE FOR CARRYING OUT THE INVENTION

Figure 1:
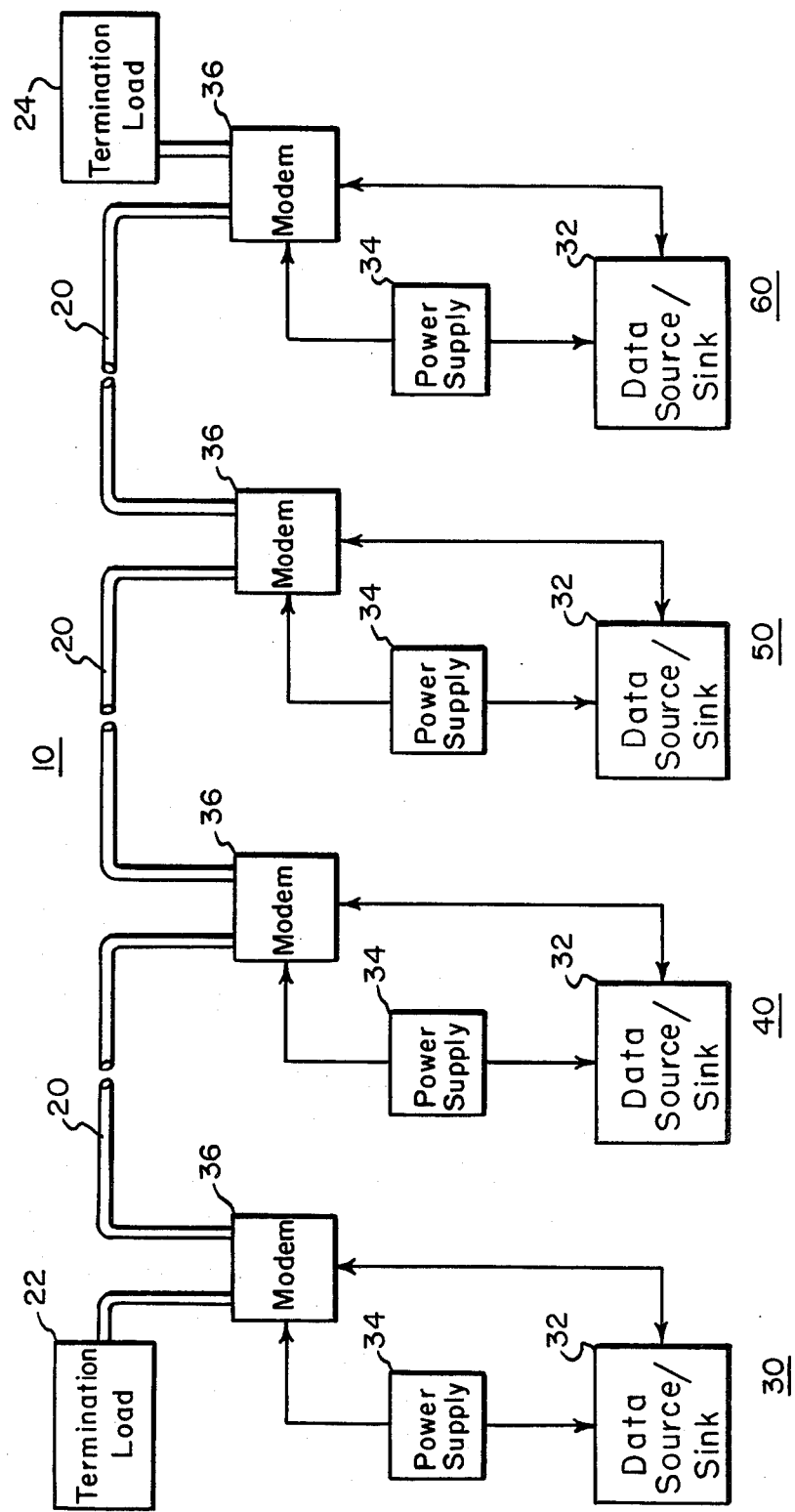
FIG. 1 is a block diagram illustrating a data communication system in which my invention may be practiced.

As shown in FIG. 1, a typical high speed data communication system 10 comprises a multiplicity of stations interconnected by a coaxial cable 20. In FIG. 1, four such stations 30, 40, 50, 60 are shown, but in practice, many more might be interconnected via coaxial cable 20. Each station comprises a data source/sink 32, a power supply 34 and a modem 36. The data source/sink can be a central processing unit, a microcomputer, a keyboard, a printer, a display, or any of a large number of other data communication devices. The modem comprises a transmitter and a receiver and serves as an interface between the data source/sink and the coaxial cable. To minimize losses, coaxial cable 20 is terminated at both ends with a termination load 22, 24 that is equal to the characteristic impedance of the coaxial cable. The particular coaxial cable that is used will vary depending on the number of stations connected by the cable and the total length of the system.

In the illustrative embodiment of my invention, the communication network is operated asynchronously at data rates of up to 250,000 bits per second in a half-duplex mode. The term asynchronous as used herein means that the modem neither provides unit interval timing to nor requires unit interval timing from the data source/sinks connected to the communication system. The term half-duplex mode means that only one modem may transmit at any time. Illustratively, the MARK and SPACE data signals are transmitted on the coaxial cable as frequencies of 2.5 MHz and 3.5 MHz, respectively, and each MARK is represented by at least 9 cycles of 2.5 MHz and each SPACE by at least thirteen cycles of 3.5 MHz. The system length may be up to about five miles (8000 meters) long and as many as 100 or so stations may be interconnected by the coaxial cable because of the improved coupling techniques used.

Figure 2:
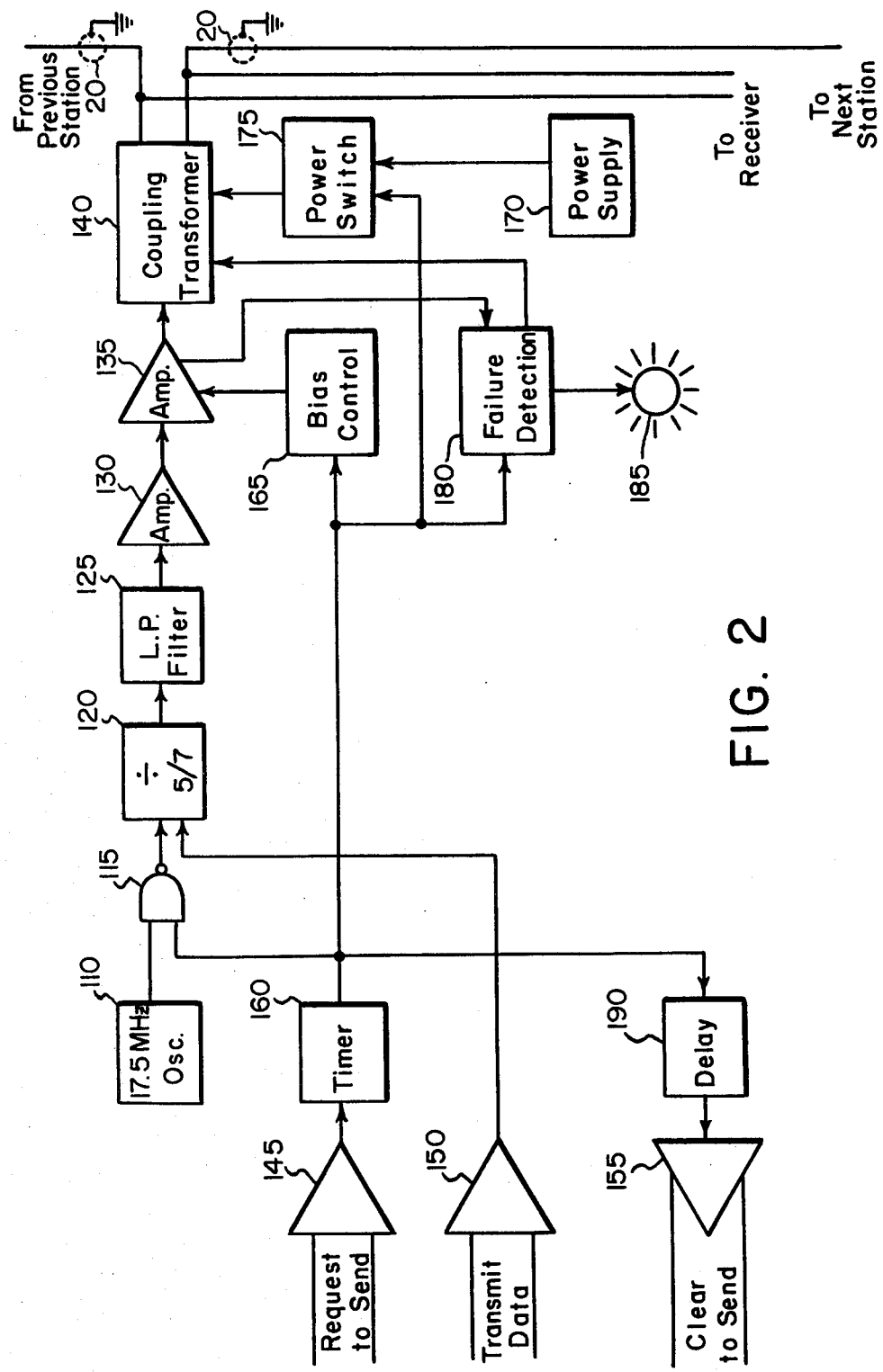
FIG. 2 is a block diagram depicting an illustrative embodiment of a modem transmitter of my invention.

As shown in FIG. 2, the modem transmitter comprises an oscillator 110, a gate 115, a divider 120, a low pass filter 125, an amplifier 130, an output amplifier 135 and a coupling transformer 140. The modem transmitter further comprises interface drivers 145, 150, 155 for standard EIA RS-422 request to send, transmit data, and clear to send interface signals, respectively, a timer 160, a bias control 165, a power supply 170, a power switch 175, a failure detection circuit 180, a light 185 that warns of transmitter failure, and a delay circuit 190.

Since the transmission system is a half-duplex system it is necessary to limit the transmission time of each station so as to prevent one station from tying up the transmission line indefinitely. Timer 160 provides an interval on the order of 0.1 seconds during which the modem transmitter is operative. At the data transmission rate of 250,000 bits per second, this interval is almost always sufficient to accommodate the transmission needs of an individual station in the present embodiment of this invention which typically uses messages shorter than 10 milliseconds. Other timer intervals obviously could be used to accommodate different signaling requirements. Oscillator 110 produces a 17.5 MHz output signal. Under the control of the timer output, this signal is gated by gate 115 into divider 120. Divider 120 divides down the oscillator signal by five or by seven depending on whether a SPACE or a MARK is received from transmit data interface driver 150. Further details concerning the operation of divider 120 are set forth in the above-referenced patent application for "Switched Frequency Divider".

When a data source/sink is ready to transmit data, it issues a request to send signal to the modem to which it is connected. Upon receipt of a request to send signal at interface driver 145, the output of timer 160 goes high and stays high for a period of 0.1 seconds unless it is terminated earlier by removal of the request to send signal. This output enables gate 115 so as to apply the output of oscillator 110 to divider stage 120 and ultimately to the communication line. The timer output is also applied to bias control 165 to condition output amplifier 135 for the transmission of data and to power switch 175 so as to connect power supply 170 to coupling transformer 140. The signal from divider 120 is received by the receiver of the same modem; and in about 15 microseconds, a carrier detect signal is provided to the data source/sink. Delay circuit 190 produces a delay of 30 to 60 microseconds which is enough to permit the bias control and power switch to stabilize and then produces a clear to send signal at the output of interface driver 155. The clear to send signal is provided to the data source/sink and indicates that the modem is ready for data transmission.

Upon verifying the presence of carrier and receiving of the clear to send signal, the data source/sink begins to transmit data to interface driver 150. This data is applied to divider stage 120 which divides the 17.5 MHz oscillator signal by seven for each MARK signal that is received from the data source and by five for each SPACE signal. The 2.5 or 3.5 MHz FSK signal from divider 120 is next applied to a low pass filter that filters out higher frequency signals and passes the FSK signal to amplifier 130. The output of amplifier 130 is further amplified by output amplifier 135 and applied to coupling transformer 140. This signal is then transmitted by coaxial cable 20 to each of the other stations in the communication system. Further details concerning the operation of output amplifier 135, coupling transformer 140, bias control 165, power switch 175 and failure detection circuit 180 are set forth below in connection with FIG. 4.

Figure 3:
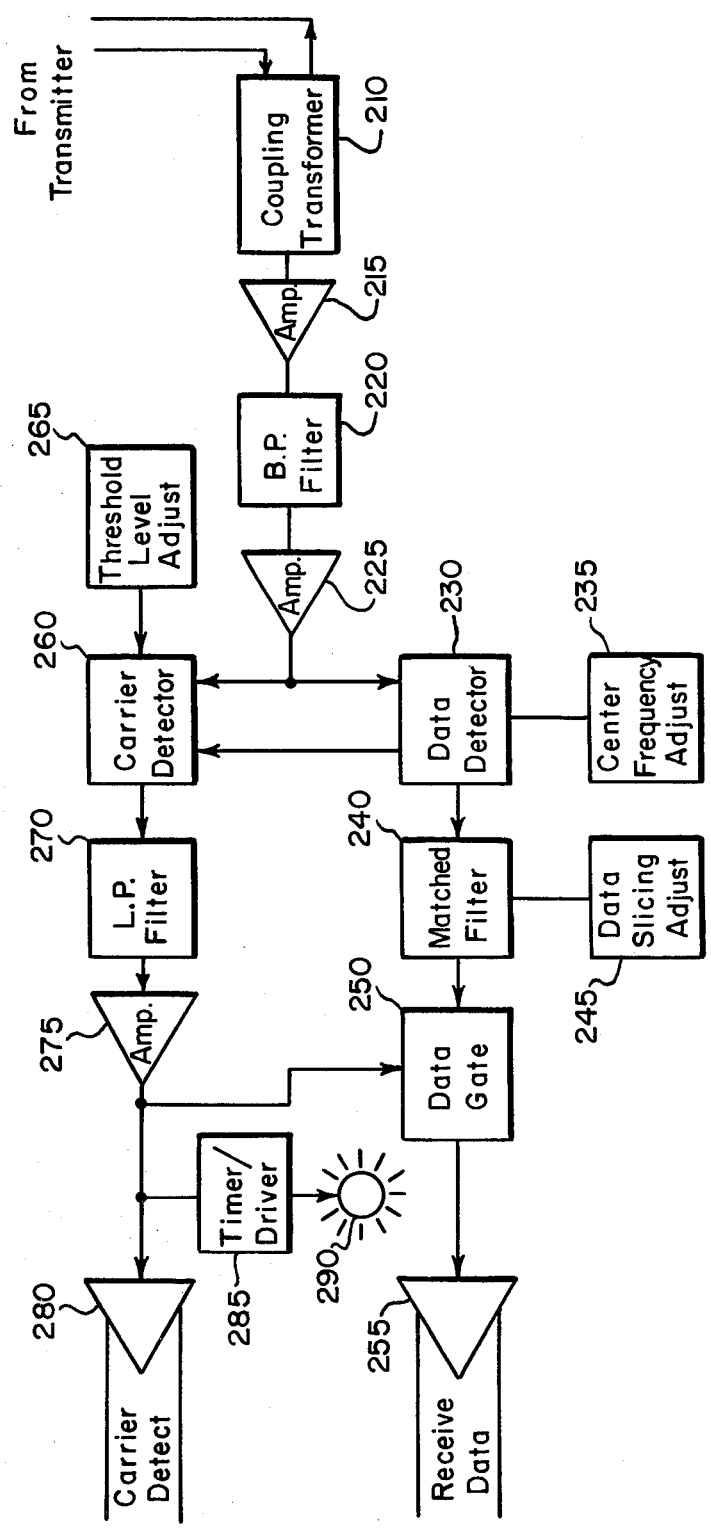
FIG. 3 is a block diagram depicting an illustrative embodiment of a modem receiver of my invention.

As shown in FIG. 3, a modem receiver of my invention comprises a coupling transformer 210, an amplifier 215, a band pass filter 220, an amplifier 225, a data detector 230 having a center frequency adjustment 235, a matched filter 240 having a data slicing adjustment 245, a data gate 250 and an interface driver 255 for the data signal. The modem receiver further comprises a carrier detector 260 having a threshold level adjustment 265, a low pass filter 270, an amplifier 275, and an interface driver 280 for the carrier detector signal. Advantageously, each of adjustments 235, 245 and 265 may be factory set and ordinarily need not be changed in the field.

Coupling transformer 210 shunts the transmission line with at least 7000 ohms impedance and provides a broadly tuned band pass input which isolates the receiver from various line transients. Amplifier 215 restores the signal level to approximately what it is on the transmission line. Band pass filter 220 has a pass band centered on approximately 3 MHz and wide enough to pass the MARK and SPACE signals. Amplifier 225 provides about 20 db of gain. Data detector 230 is a phase locked loop data detector such as an XR-210 which includes a phase detector, a tuned voltage controlled oscillator (VCO), and a voltage comparator. The center frequency of the oscillator may be adjusted by adjustment 235. The received signal is demodulated by detecting the phase difference between the received signal and the VCO output. This phase difference is embodied in a differential error voltage signal which is fed back to the VCO to phase lock the VCO output signal to the received signal.

The differential error voltage signal from the data detector is applied to a matched filter and voltage comparator 240 so as to remove unwanted frequency components of both the received signal and the VCO output and to produce a substantially square wave output. This output is applied through data gate 250 to driver 255. When there is no signal present on the transmission line, the output of filter and comparator 240 is noise. Data gate 250 suppresses this output unless a carrier is detected.

Carrier detector 260 is an operational multiplier such as the XR-2208 that multiplies the incoming signal from amplifier 225 and the output of the voltage controlled oscillator of data detector 230. The output of the multiplier is a differential dc voltage having a magnitude related to the phase difference between the two input signals. This differential signal is further amplified by detector 260 and provided as a single signal to low pass filter 270 from which it is applied to amplifier 275 and interface driver 280. The signal from amplifier 275 is also used to control data gate 250 so that no signal is applied to interface 255 in the absence of a carrier signal on the coaxial cable. In addition, the signal from amplifier 275 is also applied to a timer/driver 285 which controls a lamp 290 that signals the detection of a carrier signal. Since each transmission interval from a station is limited by transmitter timer 160 to less than 0.1 seconds, it is difficult for a human operator to determine the presence of a carrier by a visual indication that lasts only as long as the carrier signal. Timer/driver compensates for this by lighting lamp 290 for about one second whenever a carrier signal is detected by detector 260.

Figure 4:
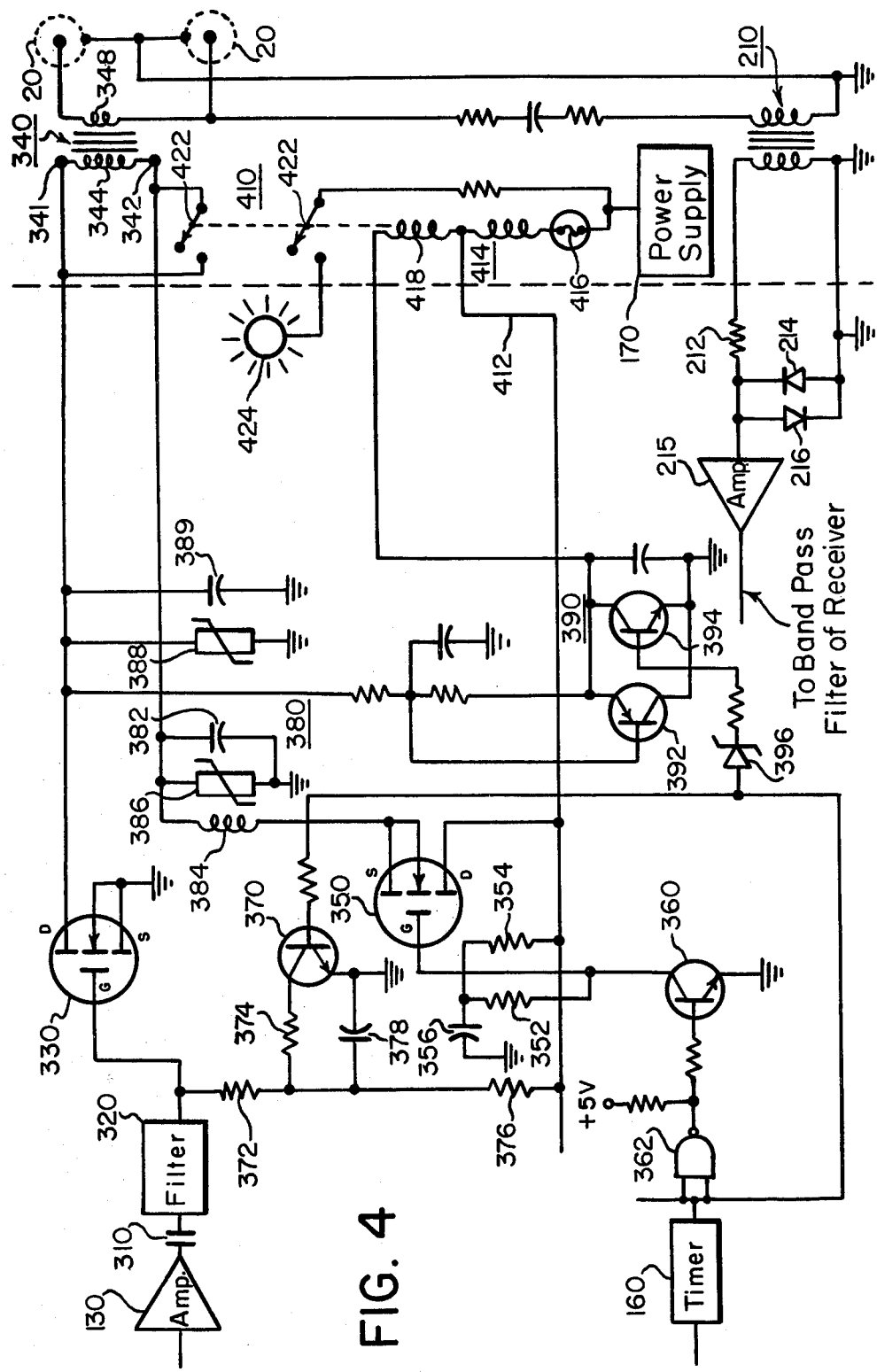
FIG. 4 is a schematic diagram depicting certain details of the modem transmitter of FIG. 2.

Further details of output amplifier 135, coupling transformer 140, and associated circuitry are set forth in FIG. 4. As shown therein, the apparatus comprises a coupling capacitor 310, a filter 320, a first field effect transistor (FET) 330, a transformer 340, a second field effect transistor 350, switching transistors 360, 370, and a low pass filter 380. The apparatus further comprises switching system 390, a relay 410 and a receiver transformer 210. Switching transistor 370 and associated resistors 372, 374 and 376 constitute bias control 165. FET 350, switching transistor 360, resistors 352, 354, NAND gate 362 and related resistors constitute power switch 175. Switching circuit 390, which comprises transistors 392, 394, Zener diode 396 and associated resistors constitutes failure detection circuit 180.

The signal from amplifier 130 is coupled by coupling capacitor 310 to filter 320 which compensates for characteristic differences in the attenuation of the 2.5 MHz and 3.5 MHz signals in the coaxial cable. The output of the filter is applied to the gate of FET 330. The drain of this transistor is connected to a first terminal 341 of a primary winding 344 of transformer 340. The source of FET 330 is connected to ground. A secondary winding 348 of transformer 340 is connected in series with the center conductors of coaxial cables 20. A second terminal 342 of the primary winding is connected through low pass filter 380 to the source of FET 350. The drain of FET 350 is connected by a line 412 through an inductor 414 and a fuse 416 to the positive terminal of power supply 170. The gate of FET 350 is connected to switching transistor 360 and through biasing resistors 352, 354, to line 412. Capacitors 356, 378 smooth out switching transients produced in FETS 330, 350. Elements 386, 388 are MOV transient protectors which protect the transmitter from electromagnetically induced transients in the transmission line and transformer secondary.

When the output of timer 160 is high, NAND gate 362 holds the base of transistor 360 low causing transistor 360 to be off. As a result, the gate of FET 350 is biased high by resistors 352, 354, causing FET 350 to be saturated and applying the positive power supply voltage to terminal 342 of primary winding 344 of transformer 340. Low pass filter 380 comprising capacitor 382 and inductor 384 acts as a short to ground for the data signals of 2.5 MHz and 3.5 MHz and thereby blocks these signals from the power supply. At the same time, the bias control causes FET 330 to operate in a linear region. In particular, when the output of timer 160 is high, transistor 370 is saturated, thereby lowering the voltage at the gate of FET 330 to the point where the FET operates in the linear mode. As a result, the signal applied to the gate of FET 330 controls in linear fashion the signal developed across primary winding 344.

When data are not being transmitted and the output of timer 160 is low, however, transistor 370 is off. In this case, the connection via resistors 372 and 376 to power supply lead 412 causes the voltage at the gate of FET 330 to be sufficiently high that the FET is saturated. As a result, first terminal 341 of the primary winding is grounded. As a result, the primary winding of the transformer is effectively shorted with respect to high frequency signals such as the data signals; and transformer 340 causes very little loss to any data signal propagating in coaxial cable 20. At the same time, the signal applied to the base of transistor 360 from NAND gate 362 is high, saturating transistor 360 and grounding the gate of FET 350. This switches off power to transformer 340.

Advantageously, as shown in FIG. 4, the modem transmitter of my invention also comprises a switching system 390 and a relay 410 for disconnecting the transmitter and shorting the primary transformer winding if the transmitter fails. Under normal operation at least one of transistors 392 and 394 is conducting; and current flows from power supply 170 through a relay winding 418 and the conducting transistor to ground. While it is so energized, relay winding 418 holds relay switch 422 open. If, however, power supply 170 should fail or any of several other mishaps occur such that both transistors 392, 394 are nonconducting, switch 422 will close, short circuiting the primary winding of transformer 340 and lighting a warning light 424. In addition to power failure, the circumstances under which switch 422 might close include the following: power overload which causes fuse 416 to blow, failure of bias control transistor 370 or FET 330, and failure of timer 160 to provide sufficient output drive as sensed by Zener diode 396. Advantageously, for convenience in servicing, the modem may be implemented on a board which is separate from the transformer coupling and power supply. The edge of the modem board is indicated in FIG. 4 by a dashed line. Disconnection of the modem board from the transformer coupling and power supply will also cause relay winding 418 to close switch 422 and short the primary winding of transformer 340.

Also shown in FIG. 4 is the receiver coupling transformer 210, amplifier 215 and clamping diodes 214, 216.

Transformer 210 shunts the transmission line with at least 7,000 Ohms impedance and provides a broadly tuned band pass input which isolates the receiver from various line transients. A resistor 212 and clamping diodes 214, 216 provide further protection against line transients.

Illustrative parameters and part numbers for the circuit elements discussed above are as follows:

timer 160—NE 555
FET 330, 350—VN 66AF
transistors 360, 370—2N 2222
transistor 392—2N 2904
transistor 394—2N 2218
diodes 220, 225—1N 4148
resistor 212—1K Ohms
resistor 352—2.2K Ohms
resistor 354—22K Ohms
resistor 372—10K Ohms
resistor 374—3K Ohms
resistor 376—12K Ohms
capacitor 356—330 picoFarad
capacitor 378—100 picoFarad
capacitor 382—0.01 microFarad
data detector 230—XR210
carrier detector 260—XR2208

Transformer 340 illustratively is a 3:1 balun transformer and transformer 210 a 1:1 balun transformer. The coaxial line illustratively has a 75 Ohm impedance and each termination load 22 also has a 75 Ohm impedance.

As will be apparent to those skilled in the art, numerous modifications may be made in the above described invention without departing from its spirit and scope. The communication system may be operated in either a contention mode or a polled mode. The use of watchdog timer 160 to prevent one modem from tying up the system will be particularly advantageous for a contention mode of operation. The data transmission frequencies are, of course, only illustrative of those that may be used in the practice of the invention. While the modem described is an FSK modem, the modem-to-line coupling technique of the present invention is generally applicable to other types of signaling as well.

What is claimed is:

1. Apparatus for coupling an AC signal to a communication line comprising:
    a transformer having first and second windings for coupling said AC signal to said communication line, said second winding being connected to said communication line,
    a first transistor having a linear region of operation and a saturated region of operation, a first terminal of said transistor being connected to a first terminal of said first winding, a second terminal of said transistor being connected to ground and said AC signal being connected to a third terminal of said transistor, said transistor applying said AC signal to said transformer when operating in said linear region and grounding said first terminal of said first winding when operating in said saturated region,
    means for biasing said transistor for linear operation when said high frequency signal is to be transmitted and for saturating said transistor when said high frequency signal is not to be transmitted,
    a second transistor having a nonconducting region of operation and a saturated region of operation, a first terminal of said second transistor being connected to a power supply,
    means for biasing said second transistor so that it is saturated when said AC signal is to be transmitted and is nonconductive when said AC signal is not to be transmitted, and
    a low pass filter connected between a second terminal of said first winding and a second terminal of said second transistor, said filter applying to said winding power from said power supply when said AC signal is to be transmitted and, when said AC signal is not to be transmitted, said first transistor and said filter providing a short circuit for AC signals across said first winding of said transformer.

2. A modem transmitter comprising:
    means for modulating an AC signal with data signals having at least two levels to produce a modulated data signal,
    a transformer having first and second windings for coupling said modulated data signal to said communication line, said second winding being connected to said communication line,
    a first transistor having a linear region of operation and a saturated region of operation, a first terminal of said transistor being connected to a first terminal of said first winding, a second terminal of said transistor being connected to ground and said modulated data signal being connected to a third terminal of said transistor, said transistor applying said modulated data signal to said transformer when operating in said linear region and grounding said first terminal of said first winding when operating in said saturated region,
    means for biasing said transistor for linear operation when o=ta are to be transmitted and for saturating said transistor when data are not to be transmitted,
    a second transistor having a nonconducting region of operation and a saturated region of operation, a first terminal of said second transistor being connected to a power supply,
    means for biasing said second transistor so that it is saturated when data are to be transmitted and is nonconductive when data are not to be transmitted, and
    a low pass filter connected between a second terminal of said first winding and a second terminal of said second transistor, said filter applying to said winding power from said power supply when data are to be transmitted and, when data are not to be transmitted, said first transistor and said filter providing a short circuit for AC signals across said first winding of said transformer.

3. A communication system comprising at least two transmitters and two receivers interconnected by a coaxial line, each transmitter comprising:
    means for modulating an AC signal with uata signals having at least two levels to produce a modulated data signal,
    a transformer having first and second windings for coupling said modulated data signal to said communication line, said second winding being connected to said communication line,
    a first transistor having a linear region of operation and a saturated region of operation, a first terminal of said transistor being connected to a first terminal of said first winding, a second terminal of said transistor being connected to ground and said modulated data signal being applied to a third terminal of said transistor, said transistor applying said modulated data signal to said transformer when operating in said linear region and grounding said first terminal of said first winding when operating in said saturated region, means for biasing said transistor for linear operation when data are to be transmitted and for saturating said transistor when data are not to be transmitted, a second transistor having a nonconducting region of operation and a saturated region of operation, a first terminal of said second transistor being connected to a power supply, means for biasing said second transistor so that it is saturated when data are to be transmitted and is nonconductive when data are not to be transmitted, and a low pass filter connected between a second terminal of said first winding and a second terminal of said second transistor, said filter applying to said winding power from said power supply when data are to be transmitted and, when data are not to be transmitted, said first transistor and said filter providing a short circuit for AC signals across said first winding of said transformer.

4. The apparatus of any one of claims 1, 2 or 3 further comprising a relay which is open when energized and closed when de-energized, said relay shorting said first winding when it is closed.

5. A method for coupling an AC signal to a communication line comprising:

biasing a first transistor for linear operation when said AC signal is to be transmitted and for saturating said transistor when said AC signal is not to be transmitted, a first terminal of said transistor being connected to a first terminal of a first winding of a transformer which couples AC signals to a communication line and a second terminal of said transistor being connected to ground, whereby said first terminal of said first winding is connected to ground when said AC signal is not to be transmitted, biasing a second transistor so that it is saturated when said AC signal is to be transmitted and is nonconductive when said AC signal is not to be transmitted, a first terminal of said second transistor being connected to a power supply and a second terminal being connected to a low pass filter which is connected to a second terminal of said first winding, said filter applying to said winding power from said power supply when said AC signal is being transmitted and providing with said ground connection of said first transistor an AC short circuit across said first winding when said AC signal is not being transmitted, and applying said AC signal to a terminal of said first transistor so as to produce a signal across said first winding which is coupled by said transformer to said communication line.

6. The method of claim 5 wherein said AC signal is modulated by data signals.

* * * * *